United States Patent [19]
Lee et al.

[11] Patent Number: 5,822,163
[45] Date of Patent: Oct. 13, 1998

[54] MAGNETIC DISK HAVING SURFACE LUBRICATION LAYERS OF DIFFERENT THICKNESS

[75] Inventors: Hyung J. Lee, Cupertino; Sang Y. Lee, Pleasanton, both of Calif.

[73] Assignee: Samsung Electronics Co., Ltd., Suwon, Rep. of Korea

[21] Appl. No.: 857,222

[22] Filed: May 15, 1997

[51] Int. Cl.$^6$ .................................................. G11B 5/82
[52] U.S. Cl. ........................................................ 360/135
[58] Field of Search ..................................... 360/135, 133

[56] References Cited

U.S. PATENT DOCUMENTS 5,650,900 7/1997 Wei .......................................... 360/135
5,674,582 10/1997 Eltoukhy ................................. 360/135

*Primary Examiner*—A. J. Heinz
*Attorney, Agent, or Firm*—Jones & Volentine, L.L.P.

[57] ABSTRACT

A magnetic disk for a disk drive includes a landing zone with a first lubrication layer having a first thickness located at an inner periphery on a surface of the magnetic disk. A data zone with a second lubrication layer having a second thickness is located on the surface of the magnetic disk outwardly of the landing zone. The first lubrication layer is thicker than the second lubrication layer. The first lubrication layer is about 16 to about 22 angstroms (Å), and the second lubrication layer is about 8 to about 11 angstroms (Å).

4 Claims, 3 Drawing Sheets

MAGNETIC DISK HAVING SURFACE LUBRICATION LAYERS OF DIFFERENT THICKNESS

BACKGROUND OF THE INVENTION

1. Field of the Invention

The present invention generally relates to a magnetic disk for a disk drive system, and more particularly, to a magnetic disk having a landing zone with a lubrication layer of a first thickness and a data zone with a lubrication layer of a second thickness, where the first thickness is greater than the second thickness.

2. Description of the Related Art

Computer disk drive technology evolution has focused on improvements in "areal density", or the number of bits of information that can be stored in a given space, or data zone, on a magnetic disk. Over the last decade, the majority of progress is has been gained through miniaturization of the recording heads and improving the magnetic efficiency of the write/read elements in the heads, and similar improvements in the magnetic and physical properties of the disks.

As shown in FIG. 1, disk drives contain a plurality of recording heads 2 that "fly" over rotating disks 4. The magnetic recording efficiency is a function of many physical characteristics of the heads and disks, the most significant of which is the spacing between the rotating disk 4 surface and the recording head "pole" elements 6. The most straightforward method for manufacturers to improve areal density has been to reduce the spacing between the head and disk, without sacrificing the long term reliability of the disk drive.

Across the previous disk drive industry product offerings, head-disk spacing had steadily decreased from several micro-inches to less than two micro-inches. As a result, the air bearing surface (ABS) 8 of the read/write head is flying very close to the disk surface and the transfer of lubricant from the medium to the head surface is inevitable, especially when the head is flying over a very smooth surface with excessive lubricant.

The amount of lubricant transfer is dependent on several parameters, including the lubrication thickness, the flying height, and the surface smoothness. For magneto-resistive (MR) drive applications, laser and mechanical texturing techniques have resulted in very smooth data zones. Smooth data zones are desirable because of the very fine spacing tolerances between the head and disk as described above.

A problem arises, however, when the disk is rotating at high speeds. In such cases, the lubricant easily migrates from the inner diameter (ID) to the outer diameter (OD) along the smooth surface of the data zone. This results in an excessive build-up of lubricant at the smooth OD area. The build-up of lubricant can temporarily increase the spacing between the disk and the recording head, degrading the disk drive performance.

In addition, over a period of time, the MR head flying over the smooth data zone picks up a significant amount of lubricant on its air bearing surface (ABS). As a result, the MR head exhibits very high static friction, or so-called "stiction" forces when the head parks and thereafter starts at the landing zone. The stiction forces in such a "fly stiction" situation or three to four times higher than without fly stiction. In some cases, the fly stiction is so strong that the disk drive motor can no longer move the recording head at the commencement of the start cycle.

In light of the foregoing, there exists a need for an apparatus and method for preventing the migration of lubricant to the outer diameter of the surface of the magnetic disk, thereby decreasing fly stiction, while ensuring reliable head contact start/stop cycles in the landing zone without materially degrading the performance of the disk drive.

SUMMARY OF THE INVENTION

The present invention is directed to lubrication layers of a magnetic disk for a disk drive and methods of forming the lubrication layers which substantially overcome one or more of the problems due to the limitations and disadvantages of the related art.

In general, the magnetic disk of the present invention includes a landing zone with a first lubrication layer having a first thickness located at an inner periphery on a surface of the magnetic disk. A data zone with a second lubrication layer having a second thickness is located on the surface of the magnetic disk outwardly of the landing zone. The first lubrication layer is thicker than the second lubrication layer. This prevents the migration of lubricant to the outer diameter of the surface of the magnetic disk while ensuring reliable head contact start/stop cycles in the landing zone.

The lubrication layers can be formed on the magnetic disk so that the upper surfaces of the lubricant in the landing zone and the data zone are substantially horizontally planar, or they may be formed so that the upper surfaces lie in different horizontal planes. In either case, the free lubricant thickness (described in more detail later in the specification) in the landing zone is thicker than the free lubricant thickness in the data zone.

To achieve these and other advantages and in accordance with the purpose of the invention, as embodied and broadly described, the invention provides for a magnetic disk for a disk drive comprising: a landing zone located at an inner periphery on a surface of the magnetic disk, the landing zone having a first lubrication layer of a first thickness; and a data zone located outwardly of the landing zone on the surface of the magnetic disk, the data zone having a second lubrication layer of a second thickness, wherein the first thickness is greater than the second thickness.

In another aspect, the present invention provides a magnetic disk for a disk drive comprising: a landing zone located at an inner periphery on a surface of the magnetic disk, the landing zone having a first lubrication layer of a first thickness; and a data zone located outwardly of the landing zone on the surface of the magnetic disk, the data zone having a cured lubrication layer on the surface of the magnetic disk and a second lubrication layer of a second thickness overlying the cured lubrication layer, wherein the first thickness is greater than the second thickness, and wherein an upper surface of the first lubrication layer overlying the landing zone, and an upper surface of the second lubrication layer overlying the data zone, are substantially horizontally planar.

In yet another aspect of the present invention, there is provided a method of forming lubrication layers with different thickness on a magnetic disk having a landing zone at an inner periphery and a data zone disposed outwardly thereof, the method comprising the steps of: applying a first lubrication layer having a first thickness on an entire surface of the magnetic disk; rotating the lubricated disk at a high speed; spraying a solvent on a portion of the first lubrication layer corresponding to the data zone; forming the landing zone having the first lubrication layer of the first thickness; and forming the data zone having a second lubrication layer of a second thickness, wherein the first thickness is greater than the second thickness.

After the forming steps, an upper surface of the first lubrication layer overlying the landing zone defines a first horizontal plane, and an upper surface of the second lubrication layer overlying the data zone defines a second different horizontal plane.

In still another aspect of the present invention, there is provided a method of forming lubrication layers with different thickness on a magnetic disk having a landing zone at an inner periphery and a data zone disposed outwardly thereof, the method comprising the steps of: applying a first lubrication layer having a first thickness on an entire surface of the magnetic disk; rotating the lubricated disk at a high speed; exposing a portion of the first lubrication layer corresponding to the data zone to ultra-violet (UV) light; and curing a first part of the first lubrication layer in the data zone, thereby forming a cured lubrication layer overlying the data zone, wherein a second part of the first lubrication layer in the data zone forms a second lubrication layer having a second thickness overlying the cured lubrication layer, and wherein the first thickness is greater than the second thickness.

After the curing and forming steps, an upper surface of the lubricant overlying the landing zone, and an upper surface of the lubricant overlying the data zone, are substantially horizontally planar.

It is to be understood that both the foregoing general description and the following detailed description are exemplary and explanatory and are intended to provide further explanation of the invention as claimed.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

The present invention is directed to a magnetic disk having a landing zone with a first lubrication layer having a first thickness, located at an inner periphery on a surface of the magnetic disk, and a data zone with a second lubrication layer having a second, lesser thickness located on the surface of the magnetic disk outwardly of the landing zone.

Figure 1:
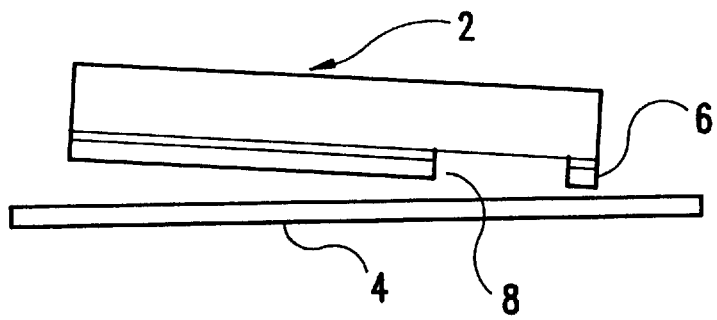
FIG. 1 is a side view of a recording head "flying" over a disk.
Figure 2:
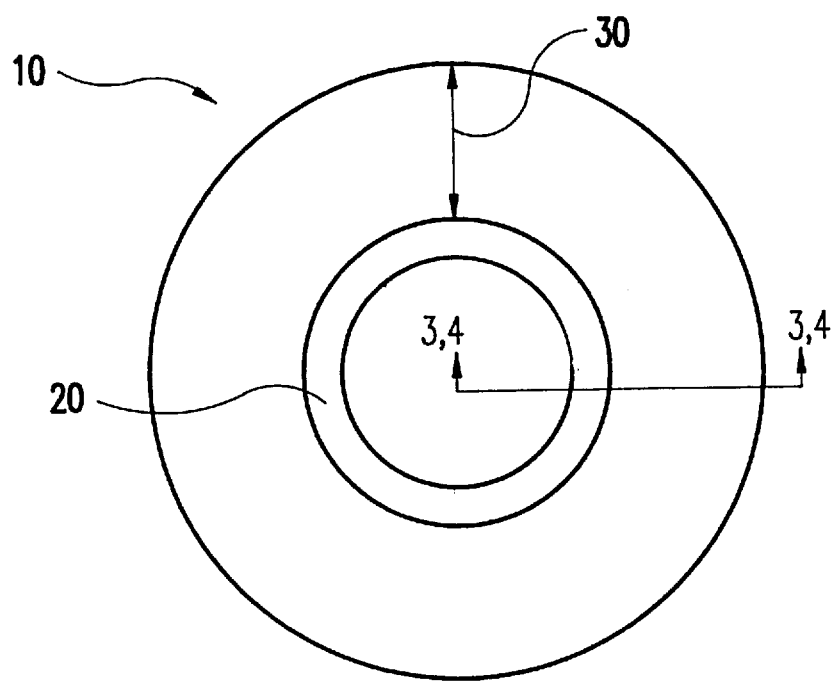
FIG. 2 is a plan view of magnetic disk having a landing zone and a data zone.

The operation of the disk drive is first described with reference to FIGS. 1 and 2. The magnetic disk 10 is driven by a motor (not shown) at a given rpm for reading data from, or writing data to, the disk. The magnetic disk 10 contains a landing zone 20 and a data zone 30. The landing zone 20, at the inner periphery of the disk, is the portion of the disk where a recording head, such as that shown in FIG. 1, returns to after each stop cycle. The data zone 30 typically contains a series of tracks and sectors for storing data and extends from the landing zone 20 toward the outer periphery of the disk. As described previously, when the recording head moves over the disk surface the lubricants on the surface of the magnetic disk can build-up between the head poles of the recording head and the disk surface. Also, when the disk is rotating at high speeds, the lubricant may easily migrate from the inner diameter (ID) to the outer diameter (OD) along the smooth surface of the data zone 30, resulting in an excessive build-up of lubricant at the smooth OD area. Consequently, the MR head flying over the smooth data zone 30 picks up a significant amount of lubricant on its air bearing surface (ABS).

Figure 3:
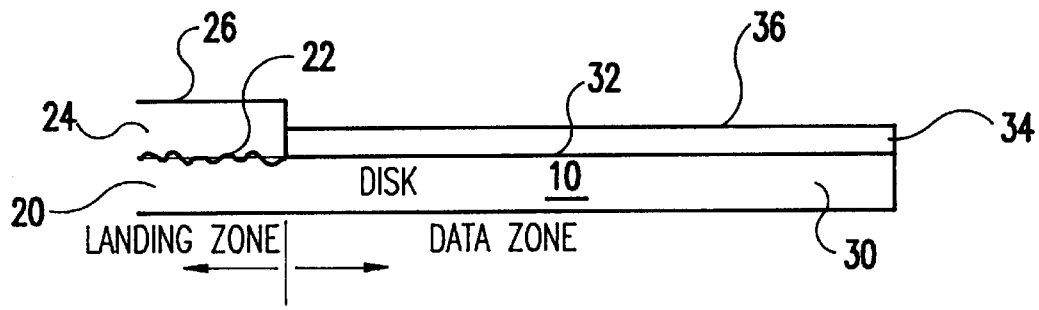
FIG. 3 is a cross section view of an embodiment of the lubrication layers on the magnetic disk of FIG. 2, taken along the line 3—3.
Figure 5:
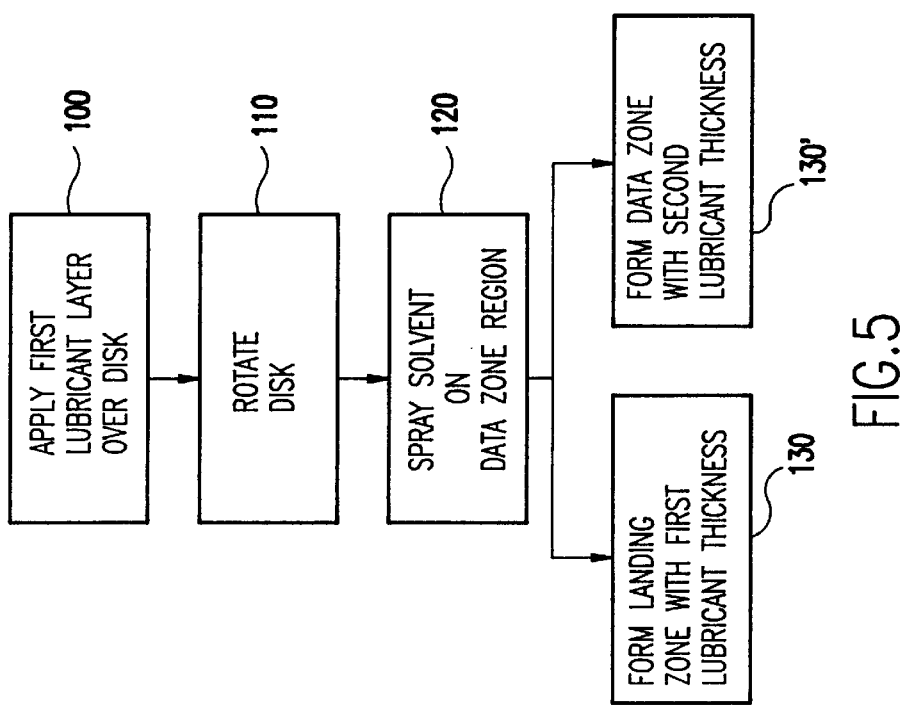
FIG. 5 is a process flow diagram of an exemplary method of forming the lubrication layers on the magnetic disk of FIG. 3.

Reference will now be made to FIGS. 3 and 5, which illustrate an exemplary embodiment and method of forming the lubrication layers on the magnetic disk. The landing zone 20 and data zone 30 perform different functions, and accordingly, have different surface characteristics as shown in FIG. 3.

In the landing zone area 20, the exposed surface 22 of the disk 10 is manufactured so as to be coarse or jagged when viewed in cross section as shown in FIG. 3. Note that the dimensions in FIG. 3 have been exaggerated and distorted to better illustrate the features of the present invention. The average mean-to-peak roughness of the coarse surface is about 30 Å to about 50 Å.

The coarse or jagged surface 22 may be formed by, for example, laser texturing or mechanical texturing. With laser texturing, the rotating disk is exposed to a small high-powered laser beam creating small bumps on the surface of the disk. With mechanical texturing, the rotating disk surface is roughened by using diamond and alumina abrasive tapes.

The coarse surface 22 is preferable in the landing zone area 20 since this is the portion of the disk where the recording head returns to after each stop cycle. The coarse or jagged surface 22 acts to reduce the static friction, or stiction forces on the head during the contact start/stop (CSS) cycles.

On the other hand, as shown in FIG. 3, the disk surface 32 in the data zone 30 is manufactured to be smooth due to the required spacing tolerances (i.e., less than two micro-inches) between the flying head and the disk surface in the data zone 30 region.

The average mean-to-peak roughness of the smooth surface is about 5 Å to about 15 Å. The smooth surface 32 may be formed, for example, by mechanical lapping with a very fine diamond slurry powder.

In an effort to reduce the very high static friction, or stiction forces associated with a "fly stiction" situation, and to prevent the migration of lubricant to the OD, the present invention provides for magnetic disk comprising a lubricant layer 24 in the landing zone 20 of a first thickness, and a lubricant layer 34 in the data zone 30 of a second, lesser thickness as shown in FIG. 3.

The lubricant may be any conventional magnetic disk lubricant, for example, a per-fluro polyether (PFPE). The thickness of the lubricant layer 24 in the landing zone 20 is approximately 16 to 22 angstroms (Å), while the thickness of the lubricant layer 34 in the data zone 30 is approximately 8 to 11 angstroms (Å). It is understood, however, that the thicknesses of the respective lubricant layers 24 and 34 in the landing zone and data zone may vary within the scope of the present invention. What is important in this embodiment is that the thickness of the lubricant layer 34 in the data zone 30 be less than the thickness of the lubricant layer 24 in the landing zone 20, while maintaining the required head-disk spacing tolerances in the data zone 30.

As shown in FIG. 3, the upper surface 26 of the first lubrication layer 24 overlying the landing zone 20 defines a first horizontal plane, and the upper surface 36 of the second lubrication layer 34 overlying the data zone 30 defines a second different horizontal plane. Such a dual thickness lubrication layer structure may be formed by a method as set forth in the process flow diagram of FIG. 5.

In the first step 100, a first lubricant layer 24 of PFPE, for example, is formed to a thickness of 16–22 Å over the entire surface of the magnetic disk by a dipping process. In such a process, a batch of disks are dipped into a PFPE and solvent tank, and then the liquid is slowly drained from the tank. The thickness of the lubricant on the disk surface depends on the draining speed of the liquid from the tank.

The lubricated disk is then placed on a high speed spin stand rotating at 150 to 1500 rpm (step 110). In step 120, a freon free solvent is sprayed from a nozzle toward the disk, with the nozzle spray direction moving from the inner diameter (ID) of the data zone 30 to the outer diameter (OD), thereby reducing the thickness of the lubrication layer in this region to form the lubrication layer 34 of the data zone 30, resulting in the step-like lubrication layer cross section as shown in FIG. 3 (steps 130 and 130'). With a 3.5 inch disk, for example, the ID of the data zone 30 is approximately 0.8 inches from the center. The ID of the data zone 30 will vary of course with different sized disks.

Figure 4:
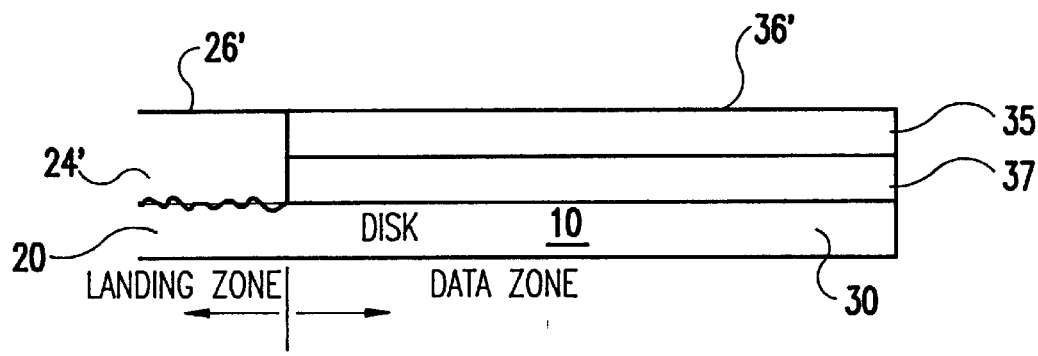
FIG. 4 is a cross section view of an alternate embodiment of the lubrication layers on the magnetic disk of FIG. 2, taken along the line 4—4.

FIG. 4 is an alternate embodiment of the present invention where the thickness of a free lubricant layer 35 in the data zone 30 is less than the thickness of the free lubricant layer 24' in the landing zone 20, but where the upper surface 26' of the free lubrication layer 24' overlying the landing zone 20, and the upper surface 36' of the free lubrication layer 35 overlying the data zone 30, are substantially horizontally planar. In this embodiment, free lubricant refers to lubricant that could migrate from the ID to the OD as the disk is spinning.

The structure of FIG. 4 may be achieved by the addition of a cured or bonded lubrication layer 37 that is formed on the surface of the magnetic disk 10. This cured lubrication layer 37 underlies the free lubrication layer 35, and is of sufficient thickness to ensure a substantially horizontally planar lubrication layer cross section.

Figure 6:
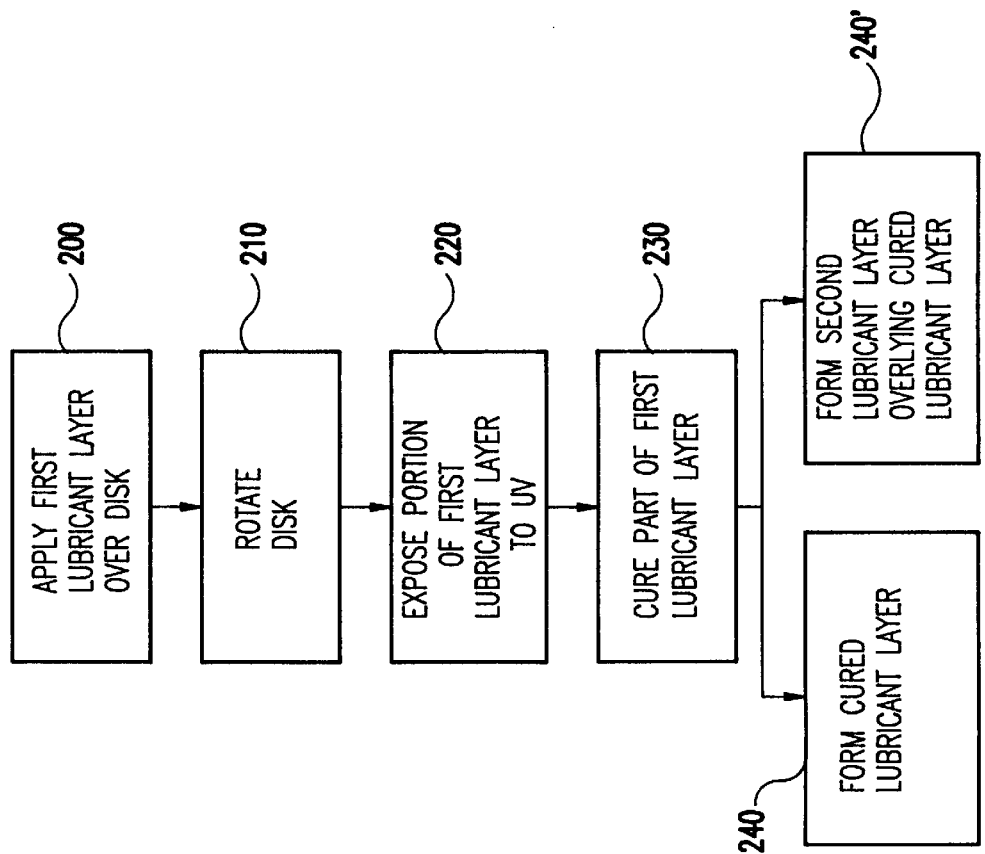
FIG. 6 is a process flow diagram of an exemplary method of forming the lubrication layers on the magnetic disk of FIG. 4.

Such a structure may be formed, for example, by employing ultra-violet (UV) radiation and curing process steps as set forth in the process flow diagram of FIG. 6. First, in a manner similar to the previous embodiment, a first lubricant layer 24' of PFPE is applied over the entire surface of the magnetic disk 10 by a dipping process (step 200). The lubricated disk is then rotated on a high speed spin stand at 150 to 1500 rpm (step 210).

The portion of the disk corresponding to the data zone 30 is then exposed to a stream of high-intensity ultra-violet (UV) light (step 220) having an intensity of about 50 to 100 W/cm$^2$. The UV light will cure a part of the first lubrication layer (step 230), resulting in a cured or bonded lubrication layer 37. Note that the cured or bonded lubrication layer 37 would not migrate from the ID to the OD of the disk as the disk spins. The remaining uncured or free portion of the first lubrication layer becomes the free lubrication layer 35, which overlies the cured lubrication layer 37 (steps 240 and 240').

The resulting magnetic disk 10 exhibits a landing zone 20 with a thicker free lubrication layer 24' than the free lubrication layer 35 overlying the data zone 30. However, with the addition of the cured lubrication layer 37, the upper surface 26' of the lubrication layer 24' overlying the landing zone 20, and the upper surface 36' of the lubrication layer 35 overlying the data zone 30, are substantially horizontally planar.

In an exemplary embodiment, the thickness of the free lubricant layer 24' in the landing zone 20 may be approximately 16 to 22 angstroms (Å), while the thickness of the free lubrication layer 35 and the cured lubrication layer 37 in the data zone 30 are approximately 8 to 11 angstroms (Å) each. It is understood, however, that the thicknesses of the respective lubricant layers 24', 35, and 37 in the landing zone and data zone may vary within the scope of the present invention. What is important in this embodiment is that the thickness of the free lubricant layer 35 in the data zone 30 be less than the thickness of the free lubricant layer 24' in the landing zone 20, while maintaining the required head-disk spacing tolerances in the data zone 30.

In the present invention, the lubrication layers on the magnetic disk and methods of forming such layers result in a thinner layer of lubricant over the data zone region to prevent the migration of lubricant to the outer diameter of the surface of the magnetic disk. This decreases the possibility of fly stiction, while ensuring reliable head contact start/stop cycles in the landing zone without materially degrading the performance of the disk drive. The lubrication layers on the magnetic disk and methods of forming such layers of the present invention may be utilized in many types of disk drive systems, including hard disk drives or removable hard disk cartridge systems.

While the invention has been described in terms of the embodiments described above, those skilled in the art will recognize that the invention can be practiced with modification within the spirit and scope of the appended claims and their equivalents.

Having thus described my invention, what we claim as new and desire to secure by Letters Patent is as follows:

1. A magnetic disk for a disk drive comprising:
   a landing zone located at an inner periphery on a surface of said magnetic disk, said landing zone having a first lubrication layer of a first thickness; and
   a data zone located outwardly of said landing zone on the surface of the magnetic disk, said data zone having a second lubrication layer of a second thickness,
   wherein said first thickness is greater than said second thickness and said first thickness is about 16 Å to about 22 Å.

2. The magnetic disk of claim 1, wherein said second thickness is about 8 Å to about 11 Å.

3. A magnetic disk for a disk drive comprising:

a landing zone located at an inner periphery on a surface of said magnetic disk, said landing zone having a first lubrication layer of a first thickness; and a data zone located outwardly of said landing zone on the surface of the magnetic disk, said data zone having a cured lubrication layer on said surface of said magnetic disk and a second lubrication layer of a second thickness overlying said cured lubrication layer, wherein said first thickness is greater than said second thickness and said first thickness is about 16 Å to about 22 Å, and wherein an upper surface of said first lubrication layer overlying said landing zone, and an upper surface of said second lubrication layer overlying said data zone, are substantially horizontally planar.

4. The magnetic disk of claim 3, wherein said second thickness is about 8 Å to about 11 Å.

* * * * *